US009477600B2

(12) United States Patent
Jalal et al.

(10) Patent No.: US 9,477,600 B2
(45) Date of Patent: Oct. 25, 2016

(54) APPARATUS AND METHOD FOR SHARED CACHE CONTROL INCLUDING CACHE LINES SELECTIVELY OPERABLE IN INCLUSIVE OR NON-INCLUSIVE MODE

(75) Inventors: Jamshed Jalal, Austin, TX (US); Mark David Werkheiser, Austin, TX (US); Brett Stanley Feero, Austin, TX (US); Michael Alan Filippo, Driftwood, TX (US)

(73) Assignee: ARM LIMITED, Cambridge (GB)

( * ) Notice: Subject to any disclaimer, the term of this patent is extended or adjusted under 35 U.S.C. 154(b) by 570 days.

(21) Appl. No.: 13/137,357

(22) Filed: Aug. 8, 2011

(65) Prior Publication Data
US 2013/0042070 A1    Feb. 14, 2013

(51) Int. Cl.
*G06F 12/08*      (2016.01)

(52) U.S. Cl.
CPC ......... *G06F 12/084* (2013.01); *G06F 12/0811* (2013.01); *G06F 2212/502* (2013.01); *G06F 2212/601* (2013.01)

(58) Field of Classification Search
CPC ............ G06F 12/084; G06F 12/0811; G06F 12/0815; G06F 2212/502; G06F 2212/601; G06F 2212/62; G06F 2212/621
USPC .......................................... 711/130, 144, 146
See application file for complete search history.

(56) References Cited

U.S. PATENT DOCUMENTS

| 5,291,442 | A | 3/1994 | Emma et al. ................. 711/120 |
|---|---|---|---|
| 5,623,632 | A | 4/1997 | Liu et al. ..................... 711/144 |
| 5,682,516 | A | 10/1997 | Sarangdhar et al. ......... 711/146 |
| 5,802,577 | A | 9/1998 | Bhat et al. .................... 711/146 |
| 5,809,536 | A | 9/1998 | Young et al. ................. 711/144 |
| 5,813,034 | A | 9/1998 | Castle et al. ................. 711/146 |
| 5,829,033 | A | 10/1998 | Hagersten et al. ........... 711/141 |
| 5,864,671 | A | 1/1999 | Hagersten et al. ........... 709/213 |
| 5,926,830 | A | 7/1999 | Feiste .......................... 711/122 |
| 6,052,760 | A | 4/2000 | Bauman et al. .............. 711/119 |
| 6,275,909 | B1 | 8/2001 | Arimilli et al. .............. 711/146 |
| 6,314,498 | B1 * | 11/2001 | Arimilli et al. .............. 711/144 |
| 6,324,622 | B1 | 11/2001 | Okpisz et al. ................ 711/146 |
| 6,338,124 | B1 | 1/2002 | Arimilli et al. .............. 711/144 |
| 6,343,347 | B1 | 1/2002 | Arimilli et al. .............. 711/143 |
| 6,351,791 | B1 | 2/2002 | Freerksen et al. ........... 711/146 |
| 6,353,875 | B1 | 3/2002 | Arimilli et al. .............. 711/143 |
| 6,502,171 | B1 | 12/2002 | Arimilli et al. .............. 711/146 |
| 6,810,467 | B1 | 10/2004 | Khare et al. ................. 711/146 |

(Continued)

OTHER PUBLICATIONS

UK Search Report dated Sep. 26, 2012 for GB 1210115.0.

(Continued)

*Primary Examiner* — Tuan Thai
*Assistant Examiner* — Glenn Gossage
(74) *Attorney, Agent, or Firm* — Nixon & Vanderhye PC

(57) ABSTRACT

A data processing system 2 includes a cache hierarchy having a plurality of local cache memories and a shared cache memory 18. State data 30, 32 stored within the shared cache memory 18 on a per cache line basis is used to control whether or not that cache line of data is stored and managed in accordance with non-inclusive operation or inclusive operation of the cache memory system. Snoop transactions are filtered on the basis of data indicating whether or not a cache line of data is unique or non-unique. A switch from non-inclusive operation to inclusive operation may be performed in dependence upon the transaction type of a received transaction requesting a cache line of data.

24 Claims, 5 Drawing Sheets

(56) References Cited

U.S. PATENT DOCUMENTS

| | | | |
|---|---|---|---|
| 6,848,003 B1 | 1/2005 | Arimilli et al. | 709/232 |
| 6,928,522 B2* | 8/2005 | Yang | 711/144 |
| 7,325,102 B1 | 1/2008 | Cypher | 711/146 |
| 7,640,399 B1 | 12/2009 | Lepak et al. | 711/136 |
| 2001/0025335 A1 | 9/2001 | Freerksen et al. | 711/146 |
| 2002/0078310 A1 | 6/2002 | Frank et al. | 711/148 |
| 2002/0087809 A1 | 7/2002 | Arimilli et al. | 711/144 |
| 2002/0129211 A1 | 9/2002 | Arimilli et al. | 711/146 |
| 2003/0005237 A1 | 1/2003 | Dhong et al. | 711/146 |
| 2003/0009637 A1 | 1/2003 | Arimilli et al. | 711/144 |
| 2003/0115423 A1 | 6/2003 | Chang | 711/145 |
| 2003/0120874 A1 | 6/2003 | Deshpande et al. | 711/141 |
| 2003/0131201 A1 | 7/2003 | Khare et al. | 711/144 |
| 2003/0233523 A1 | 12/2003 | Jamil et al. | 711/144 |
| 2004/0123052 A1 | 6/2004 | Beers et al. | 711/150 |
| 2004/0199727 A1 | 10/2004 | Narad | 711/138 |
| 2004/0268052 A1 | 12/2004 | Glasco | 711/141 |
| 2005/0160430 A1 | 7/2005 | Steely, Jr. et al. | 719/310 |
| 2005/0182907 A1 | 8/2005 | Shen et al. | 711/146 |
| 2005/0216672 A1 | 9/2005 | Gschwind et al. | 711/137 |
| 2006/0053258 A1 | 3/2006 | Liu et al. | 711/145 |
| 2006/0143408 A1 | 6/2006 | Sistla | 711/145 |
| 2006/0179244 A1 | 8/2006 | Goodman et al. | 711/141 |
| 2006/0212659 A1 | 9/2006 | Dieffenderfer et al. | 711/141 |
| 2006/0224839 A1 | 10/2006 | Blumrich et al. | 711/146 |
| 2006/0236037 A1 | 10/2006 | Guthrie et al. | 711/141 |
| 2007/0038814 A1* | 2/2007 | Dieffenderfer et al. | 711/141 |
| 2007/0083717 A1 | 4/2007 | Rajamony et al. | 711/141 |
| 2007/0091790 A1 | 4/2007 | Passey et al. | 370/217 |
| 2007/0143550 A1 | 6/2007 | Rajwar et al. | 711/146 |
| 2007/0156972 A1 | 7/2007 | Uehara et al. | 711/146 |
| 2008/0086601 A1 | 4/2008 | Gaither et al. | 711/141 |
| 2008/0183972 A1 | 7/2008 | Dieffenderfer | 711/146 |
| 2008/0244193 A1 | 10/2008 | Sistla et al. | 711/146 |
| 2008/0270708 A1 | 10/2008 | Warner et al. | 711/146 |
| 2008/0288725 A1 | 11/2008 | Moyer et al. | 711/146 |
| 2008/0313411 A1 | 12/2008 | Sugizaki | 711/144 |
| 2009/0138660 A1 | 5/2009 | Bell, Jr. et al. | 711/130 |
| 2009/0198912 A1 | 8/2009 | Arimilli et al. | 711/141 |
| 2009/0198915 A1 | 8/2009 | Arimilli et al. | 711/146 |
| 2009/0240892 A1 | 9/2009 | Moyer | 711/146 |
| 2009/0300289 A1 | 12/2009 | Kurts et al. | 711/133 |
| 2010/0106912 A1* | 4/2010 | Cypher et al. | 711/141 |
| 2010/0153647 A1 | 6/2010 | Guthrie et al. | 711/122 |
| 2010/0153650 A1 | 6/2010 | Guthrie et al. | 711/133 |
| 2010/0235577 A1 | 9/2010 | Guthrie et al. | 711/122 |
| 2010/0235584 A1 | 9/2010 | Guthrie et al. | 711/135 |
| 2010/0262778 A1 | 10/2010 | Cargnoni et al. | 711/118 |
| 2010/0262782 A1 | 10/2010 | Guthrie et al. | 711/122 |
| 2010/0262783 A1 | 10/2010 | Guthrie et al. | 711/122 |
| 2010/0262784 A1 | 10/2010 | Guthrie et al. | 711/122 |
| 2010/0332771 A1* | 12/2010 | Gray et al. | 711/148 |
| 2011/0264650 A1 | 10/2011 | Tobin et al. | 707/722 |

OTHER PUBLICATIONS

M. Blumrich et al, "Exploring the Architecture of a Stream Register-Based Snoop Filter" Transactions on High-Performance Embedded Architectures and Compilers III, Lecture Notes in Computer Science, 2011, vol. 6590/2011, pp. 93-114.

A. Dash et al, "Energy-Efficient Cache Coherence for Embedded Multi-Processor Systems through Application-Driven Snoop Filtering" Proceedings of the $9^{th}$ EUROMICRO Conference on Digital System Design (DSD'06), pp. 79-82.

* cited by examiner

APPARATUS AND METHOD FOR SHARED CACHE CONTROL INCLUDING CACHE LINES SELECTIVELY OPERABLE IN INCLUSIVE OR NON-INCLUSIVE MODE

BACKGROUND OF THE INVENTION

1. Field of the Invention

This invention relates to the field of data processing systems. More particularly, this invention relates to the control of a shared cache memory within a data processing system.

2. Description of the Prior Art

It is known to provide data processing systems with multiple levels of cache memories. For example, a system incorporating multiple transaction sources, such as multiple processor cores, may provide a local cache memory dedicated to each of these transaction sources and a shared cache memory that is shared between the transaction sources. For example, an individual processor core may have its own level one (L1) cache, a tightly bound cluster of processor cores may share a level two (L2) cache above the L1 caches in the hierarchy and finally a level three (L3) cache may be shared between the clusters of processors.

It is known to operate such cache hierarchies in an inclusive mode in which an individual cache line of data may stored in more than one cache within the cache hierarchy. This provides for more efficient data sharing but has the disadvantage of consuming more cache storage capacity. Another mode of operation of cache hierarchies is a non-inclusive mode (an exclusive mode). In this mode a given cache line of data is normally stored in only one cache memory of the cache hierarchy. This reduces the amount of cache storage used but is less efficient for data sharing.

SUMMARY OF THE INVENTION

Viewed from one aspect the invention provides an apparatus for processing data comprising:

a plurality of transaction sources, each of the plurality of transaction sources having a local cache memory; and a shared cache memory coupled to the plurality of transaction sources;

wherein the shared cache memory is configured to operate to store at least one of each cache line of data stored and each range of cache lines of data stored in accordance with an individually selectable one of either:

(i) an inclusive mode; and (ii) a non-inclusive mode.

The invention recognises that a shared cache memory can be formed so as to support both inclusive mode operation and non-inclusive mode operation selected on an individual cache line basis or on an individual range of cache lines basis (e.g. a range of N adjacent cache lines in memory address space are switched together between being stored in one of a non-inclusive mode or an inclusive mode). This permits an advantageous balance to be reached between the efficiency of data sharing weighed against the use of the cache storage capacity.

Whilst it is possible that the control of whether or not a cache line of data is stored in the inclusive mode or in the non-inclusive mode may be performed by dedicated separate circuitry, such as directory circuitry, it is convenient and efficient that the shared cache memory uses state data stored in the shared cache memory to control on a cache line by cache line basis whether the cache lines are stored in the inclusive mode and the non-inclusive mode.

The state data used to control the mode applied for an individual cache line can take a variety of different forms. In some embodiments, the shared cache memory stores unique status data for each cache line stored therein, and associated with a given one of the plurality of transaction sources, this unique status data indicating whether the cache line of data is stored in a local cache memory of any other of the plurality of transaction sources, i.e. indicates whether the data is stored uniquely for one transaction source or is stored non-uniquely for multiple transaction sources.

The shared cache memory may also store transaction source identifying data for a cache line of data identifying one or more of the transaction sources that are associated with that cache line of data. Thus, the transaction source identifying data may indicate an individual transaction source associated with a cache line of data within the shared cache memory that is being stored uniquely for that transaction source or may alternatively store transaction source identifying data identifying multiple transaction sources associated with the cache line data stored within the shared cache memory. An individual item of transaction source identifying data could also identify multiple transaction sources as potentially storing the cache line of data (i.e. be non-precise) and so requiring of a snoop operation (e.g. all even numbered transaction sources, all transaction sources within a certain range, etc.).

A low overhead embodiment is one in which the transaction source identifying data identifies a single transaction source from among the plurality of transaction sources. If more than one transaction source is associated with a cache line of data, then in such an embodiment the transaction source identifying data cannot track these multiple transaction sources. In other embodiments it is possible that more resources may be provided to the transaction source identifying data such that it may identify up to a maximum of a proper subset of the plurality of transaction sources as being associated with a cache line of data, i.e. more than one transaction source, but less than all of the transaction sources.

Snoop requests may be generated by snoop request generating circuitry. This snoop request generating circuitry may operate in dependence upon the unique status data discussed above in order to filter the snoop request generated.

In some embodiments the snoop request generating circuitry is configured to respond to a transaction request to a cache line of data received from one of the plurality of transaction sources to suppress generation of any snoop request to other transaction sources if that transaction hits in the shared cache memory and is stored in a non-inclusive mode. If the non-inclusive mode is in operation, then only a single copy of the cache line data will be stored and if this copy is present in the shared cache memory (as indicated by the hit), then there is no need to check for further copies and issue any snoop requests. This advantageously reduces the number of snoop requests that need be generated.

In other embodiments, the snoop request generating circuitry may be configured to respond to a transaction request to a cache line of data received from one of the plurality of transaction sources that hits in the shared cache memory to target generation of any snoop requests to transaction sources identified by the transaction source identifying data if the unique status data indicates that the cache line is stored in the inclusive mode, i.e. more than one copy of the cache line of data is stored and accordingly snoop requests need to be issued to at least one of the local cache memories.

A cache line of data may be stored by default in the non-inclusive mode. This preserves storage capacity within the cache hierarchy. A cache line of data may be switched between the non-inclusive mode to the inclusive mode when a transaction is received in respect of that cache line of data which has one of one or more predetermined types. Certain types of transaction may be indicative that the data concerned is to be shared to a degree that the sharing efficiency gains achieved by storing that data in an inclusive mode will more than justify the additional cache storage capacity consumed.

One type of transaction which may indicate such a change in mode is a transaction that will read the cache line of data to a local cache memory and not subsequently modify that cache line of data when it is stored within the local cache memory. It is known that transactions issued within memory systems may be accompanied by signals indicating their transaction type and the present technique exploits this by using the transaction type to selectively switch individual cache lines of data from being stored and manipulated in the non-inclusive mode to instead operate with the inclusive mode.

In some embodiments the shared cache memory may be configured to respond to receipt of a non-modifying read transaction from a given transaction source that hits in a cache line of data stored in a shared cache memory by a different source by returning that cache line of data to the given transaction source for storing in its local cache memory, leaving the cache line of data stored in the shared cache memory and setting the unique status data for the cache line to indicate that the cache line is stored associated with multiple transaction sources. This effectively switches and marks the cache line of data as being moved from being processed in the non-inclusive mode to being processed in the inclusive mode.

In other embodiments the shared cache memory may be configured to respond to receipt of a non-modifying read transaction from a given transaction source that misses in the shared cache memory and hits a cache line of data stored in a local cache memory of a different transaction source by returning that cache line of data to the given transaction source for storing in its local cache memory, leaving the cache line of data stored in the local cache memory where the hit was detected, storing the cache line of data in the shared cache memory and setting the unique status data for the cache line to indicate that the cache line of data is stored and associated with multiple transaction sources. In this way the cache line of data is again moved from the non-inclusive mode to the inclusive mode and made more readily available for sharing as indicated by the transaction type being a non-modified read transaction.

As previously mentioned, the default mode for storing a cache line may be the non-inclusive mode and a miss in respect of a cache line of data in the shared cache memory will accordingly, by default, store the cache line of data into a local cache memory of a transaction source request in that cache line data and not into the shared cache memory. The non-inclusively stored cache line of data may subsequently be evicted out of the local cache memory and back to the shared cache memory while the transaction source identifying data identifies that cache line of data as being associated with the transaction source which initially requested it and accordingly still manipulates that cache line of data in accordance with the non-inclusive mode of operation.

Some transaction sources which may be included within the system may not include their own local cache memory. Such transaction sources may, for example, be a simple memory mapped input/output device. In some embodiments the one or more predetermined types of transaction include one or more of a write unique transaction to part of a cache line, a write unique transaction to all of the cache line and a read once transaction that will not subsequently reuse the cache line. These transaction types may be used to force storage of the cache line of data in the shared cache memory even though the transaction source does not have its own local cache memory. The cache line of data stored in this way may remain in the shared cache memory until they are subsequently evicted. This provides transaction sources without a local cache memory with at least some cache capability.

A transaction source having a local cache memory may issue a transaction in which the predetermined type is a read that is shared and will not modify the cache line of data. In response to such a transaction, the cache line of data may be stored into the shared cache memory and into the local cache memory of the transaction source, i.e. may be stored in an inclusive mode overriding the default non-inclusive mode.

It will be appreciated that the transaction sources may take a variety of different forms, some forms may be general purpose processor cores, graphics processing units and the like. The local cache memories may include hierarchies in themselves, such as L1 and L2 cache memories. The shared cache memory may be an L3 cache memory.

In some embodiments the plurality of transaction sources may be coupled to a ring-based interconnect serving to pass snoop requests and other transactions between the different transaction sources. This provides a fast and efficient mechanism for communication that is particularly suited to scaling in which additional transaction sources and further shared cache memories may be added to the system without significant redesign or re-engineering being required.

Viewed from another aspect the present invention provides an apparatus for processing data comprising:

a plurality of transaction source means for generating transactions, each of the plurality of transaction source means having a local cache memory means for storing data; and shared cache memory means for storing data and coupled to the plurality of transaction source means;

wherein the shared cache memory means is configured to operate to store at least one of each cache line of data stored and each range of cache lines of data stored in accordance with an individually selectable one of either:

(i) an inclusive mode; and (ii) a non-inclusive mode.

Viewed from a further aspect the present invention provides a method of processing data comprising the steps of:

generating transactions with a plurality of transaction sources;

storing respective data in a local cache memory of each of the plurality of transaction sources; and storing data in a shared cache memory coupled to the plurality of transaction sources;

operating the shared cache memory and said local cache memories to store at least one of each cache line of data stored and each range of cache lines of data stored in accordance with an individually selectable one of either:

(i) an inclusive mode; and (ii) a non-inclusive mode.

The above, and other objects, features and advantages of this invention will be apparent from the following detailed description of illustrative embodiments which is to be read in connection with the accompanying drawings.

DESCRIPTION OF THE EMBODIMENTS

Figure 1:
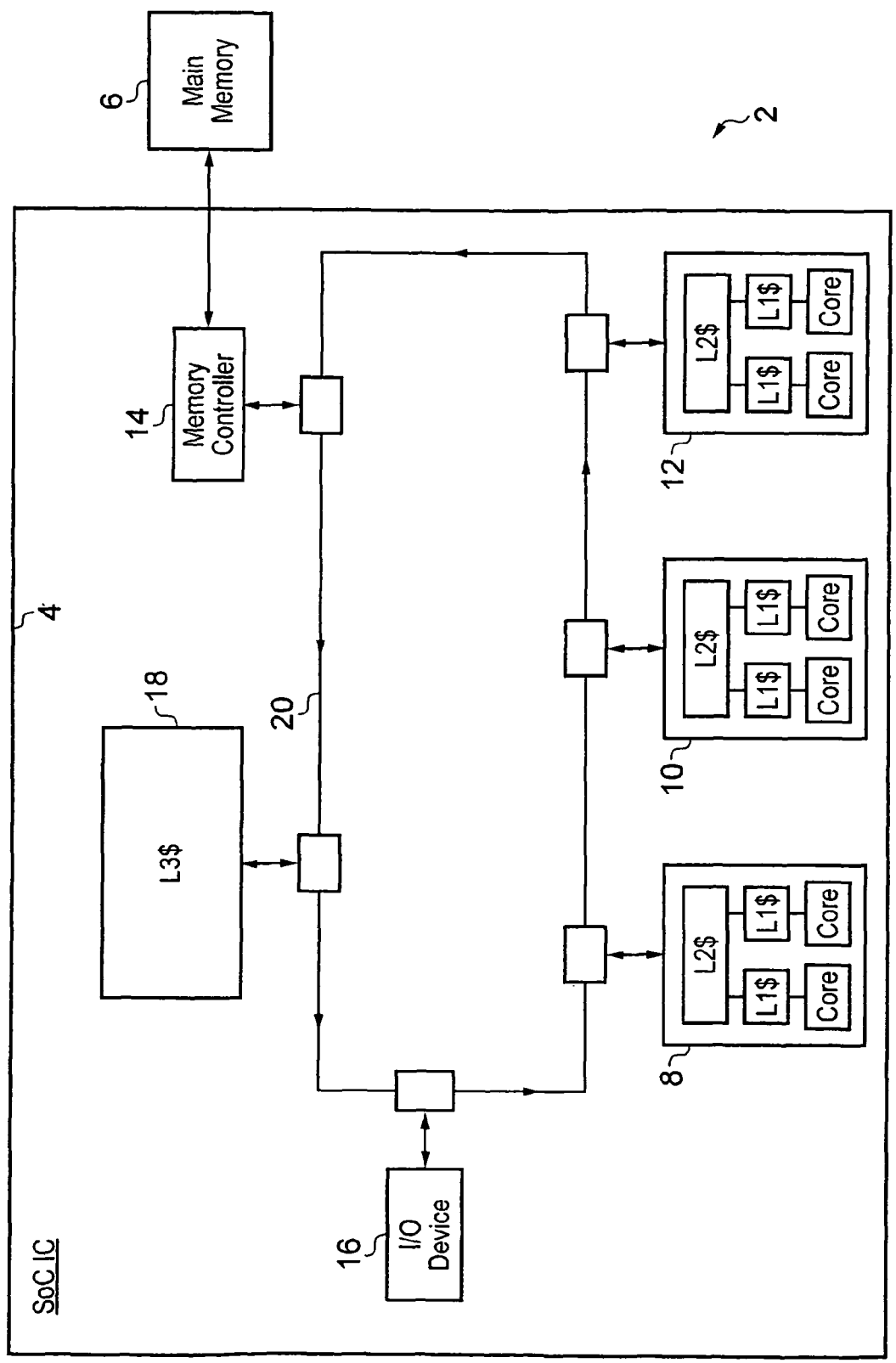
FIG. 1 schematically illustrates a data processing apparatus incorporating a plurality of transaction sources, each having its own local cache memory, coupled via a ring based interconnect to a shared cache memory.

FIG. 1 schematically illustrates a data processing apparatus 2 in the form of a system-on-chip integrated circuit 4 coupled to a main memory 6. The system-on-chip integrated circuit 4 includes a plurality of transaction sources including three processor clusters 8, 10, 12, a memory controller 14 and an input/output device 16, which does not include its own local cache memory. (In practice it may be preferred to have an even number of processor clusters to simplify workload sharing.) A shared L3 cache (L3$) memory 18 is coupled to all of these transaction sources via a ring based interconnect 20. It will be appreciated that different forms of interconnect could be used, for example a crossbar interconnect.

The processor clusters 8, 10, 12 each include two general purpose processor cores and a local cache memory, in the form of individual L1 caches associated with each processor core and a shared L2 cache that is local to the processor cluster. The processor cluster 8, 10, 12 serves as an individual transaction source in respect to its transactions with the L3 cache 18.

In general non-inclusive mode operation is adopted by default for data fetched from the main memory 6 and stored within the cache hierarchy comprising the shared cache memory 18 and the local cache memories within the transaction sources 8, 10, 12. (In other different example embodiments the default mode may be inclusive). Such default non-inclusive behavior will fetch a data item and store it only in the local cache memory of the transaction source or processor cluster 8, 10, 12 which requested that data item. If that local cache memory later becomes full, then the data may be evicted and stored within the shared cache memory 18. A single copy of that data is still stored and it will be marked within a shared cache memory 18 as associated with the originally fetching transaction source.

When a transaction source requests data which it does not store within its local cache memory, then a check is first made as to whether or not the data concerned is stored within the shared cache memory 18. If the data is not stored within the shared cache memory 18, then a check may be made by broadcast snoop requests to determine if the data is stored in the local cache memory of any of the other transaction sources. If the cache line of data is not present in either the shared cache memory 18 or any of the local cache memories, then it may be fetched from the main memory 6. It will be appreciated that in this example embodiment only a single shared cache memory 18 is illustrated. It is possible that multiple shared cache memories 18 may be provided, for example each shared cache memory may be configured to cache a different area of memory address space. This is a convenient way of scaling up the amount of shared cache memory provided by adding more shared cache memories to the ring-based interconnect 20.

The default non-inclusive mode operation applied to individual cache lines of data may be overridden such that individual cache lines of data are managed in accordance with an inclusive mode of operation in dependence upon a transaction type of a transaction directed to cache lines of data. This will be described further below.

Figure 2:
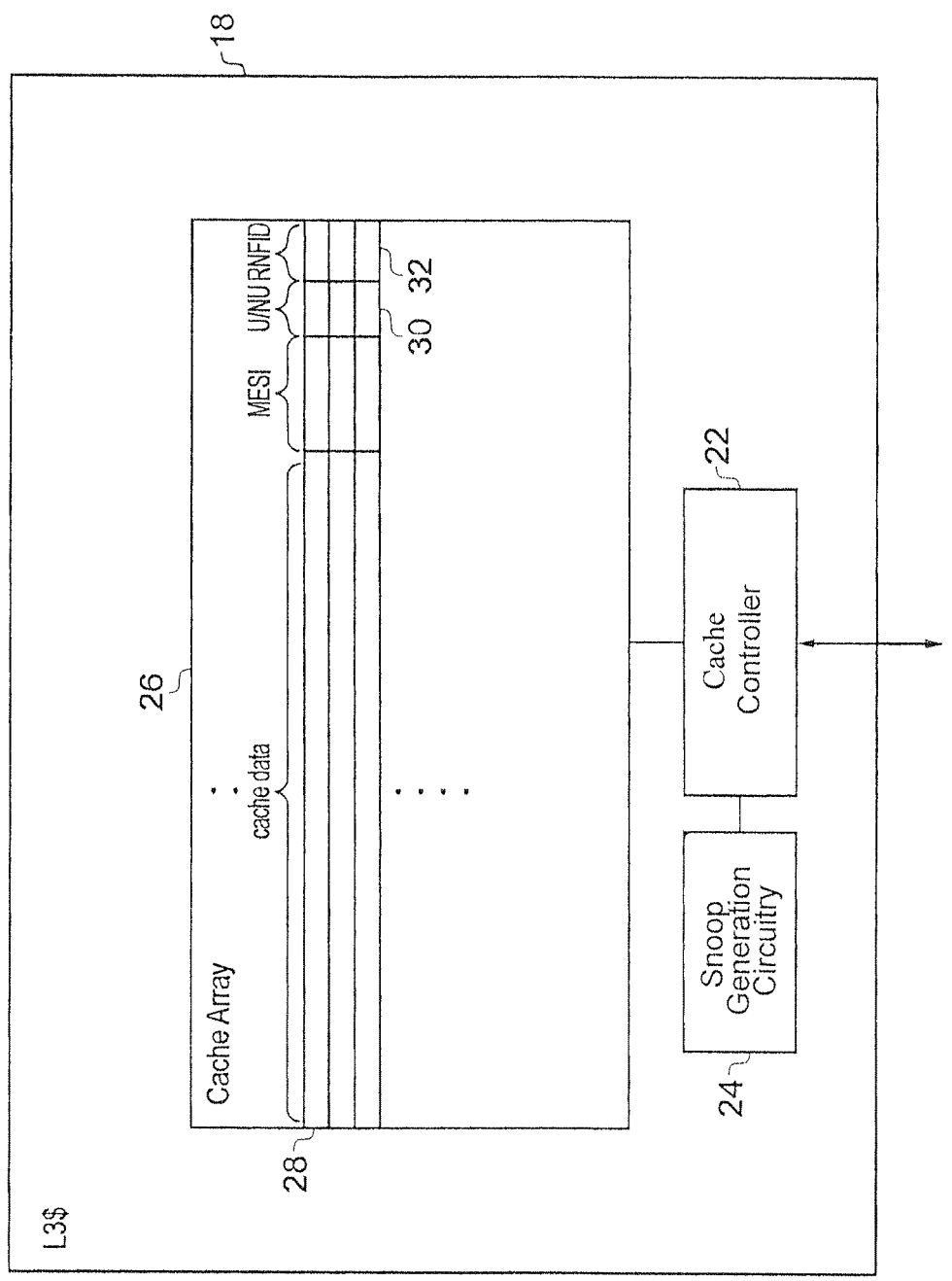
FIG. 2 schematically illustrates the shared cache memory.

FIG. 2 schematically illustrates the shared L3 cache (L3$) memory 18 in more detail. This shared cache memory 18 includes a cache controller 22, snoop generation circuitry 24 and a cache array 26. The cache array stores multiple cache lines of data 28. Each cache line of data 28 contains a data payload consisting of a copy of data values read from the main memory 6 (these may subsequently be modified within the cache and later written back to the main memory 6). Also associated with each individual cache line are MESI state data (indicating modified, exclusive, shared and invalid states) for coherency control management as well as unique status data 30 and transaction source identifying data 32.

The unique status data for each cache line of data stored in the shared cache memory and associated with a given one of the plurality of transaction sources indicates whether that cache line of data is stored in a local cache memory of any other of the plurality of transaction sources. Thus, the unique status data indicates whether or not a unique copy of that data is stored (in this case within the shared cache memory and associated with the originally requesting transaction source via the transaction source identifying data 32) or multiple copies of that data are stored and it is non-unique.

The transaction source identifying data 32 may have the form of an RNFID field of data comprising five bits which can specify one of 32 different values used to identify the transaction source which originally requested the cache line of data concerned. If the unique status data indicates that the cache line of data is unique, then the RNFID field indicates on behalf of which of the transaction sources the shared cache memory 18 is currently storing that cache line of data. If the unique status data indicates the cache line of data is not unique, i.e. multiple copies are stored in the cache system, then the RNFID field is invalid.

In other example embodiments multiple RNFID fields may be supported to identify a proper subset of the transaction sources (more than one but less than all) which are currently storing a copy of the cache line of data concerned and accordingly provide directed snoop requests thereby reducing snoop traffic. The snoop request generating circuitry 24 within the shared cache memory 18 generates snoop requests that are dependent upon the unique status data 30 for any cache line of data 28 that is stored within the cache array 26 and in respect of which a transaction request is made.

Figure 3:
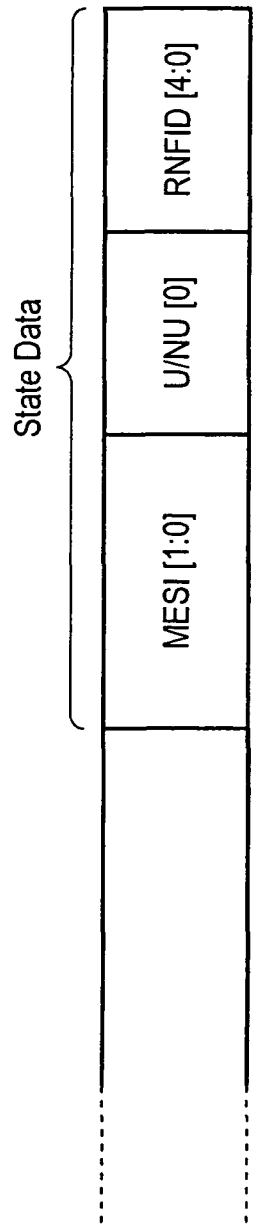
FIG. 3 schematically illustrates state data stored on a per cache line basis and used to control coherency and inclusive/non-inclusive mode operation for an individual cache line.

FIG. 3 schematically illustrates the state data stored on a per cache line basis which is used to control switching from non-inclusive mode operation to inclusive mode operation in respect of a cache line. More particularly, the state data includes a 5-bit RNFID field serving as a transaction source identifier identifying the originally requesting transaction source, a single bit of unique status data serving as a flag indicating whether or not the cache line of data stored within the cache system is associated with more than one transaction source and coherency control data in the form of a 2-bit MESI field. The MESI field is conventional coherency control data and is separate from the unique status data and the transaction source identifying data.

Figure 4:
FIG. 4 schematically illustrates an alternative form of a transaction source identifying data.

FIG. 4 illustrates a further example of the form of the transaction source identifying data In this example two RNFID fields are provided thereby enabling deterministic tracking of up to two transaction sources for which the cache hierarchy is holding a copy of the cache line of data concerned.

Figure 5:
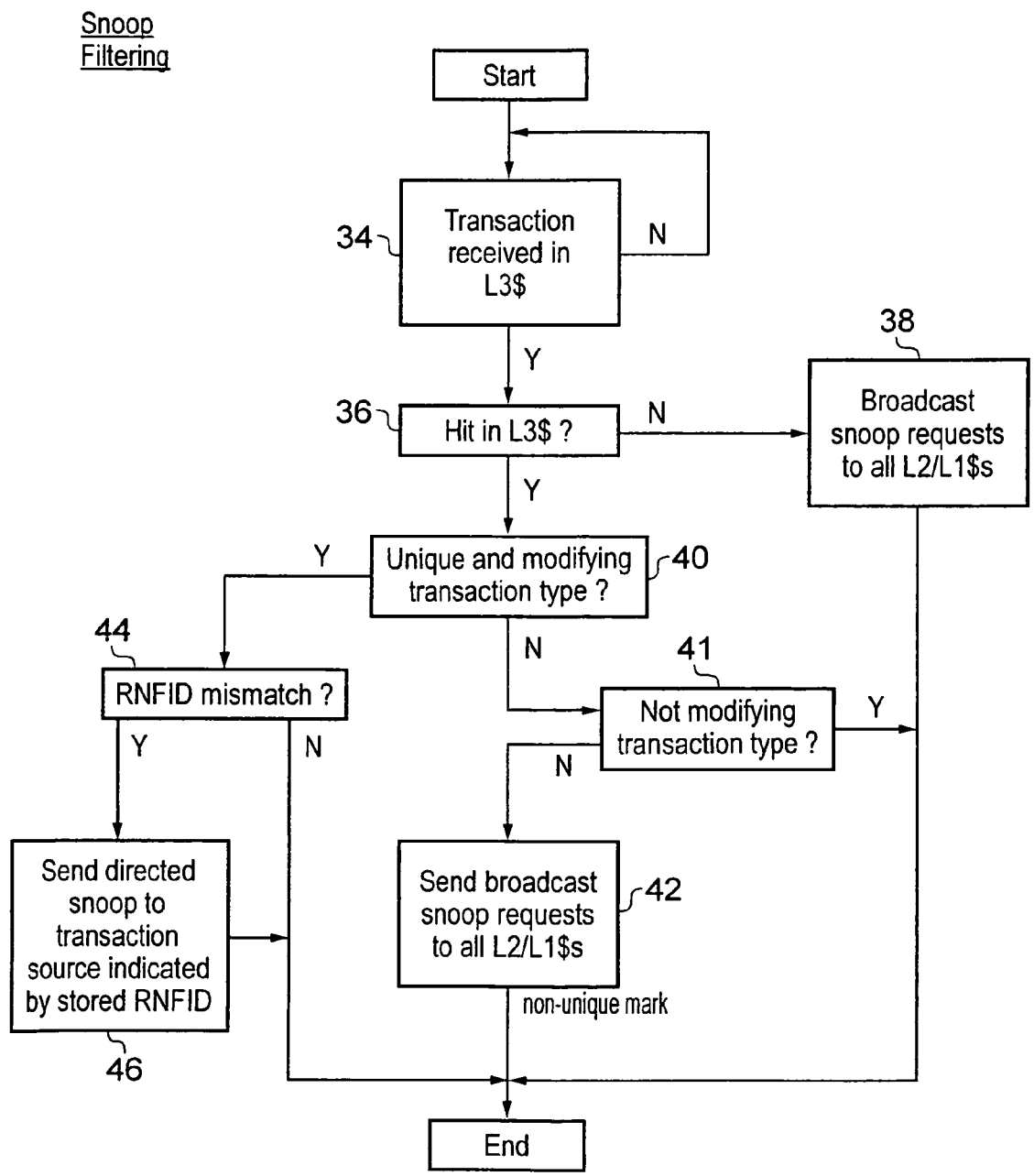
FIG. 5 is a flow diagram schematically illustrating the control of snoop filtering.

FIG. 5 is a flow diagram schematically illustrating snoop filtering that may be performed by the snoop request generating circuitry 24 to reduce the amount of snoop traffic on the ring based interconnect 20. At step 34 processing waits until a transaction is received in the shared L3 cache (L3$) memory 18. At step 36 a determination is made whether or not the transaction hits within the shared cache memory 18 (i.e. whether or not the requested cache line of data is present within the shared cache memory 18). If there is no hit, then step 38 snoop requests are broadcast to all of the local cache memories of the transaction sources 8, 10, 12.

If there is a hit at step 36, then at step 40 a determination is made whether or not the transaction type of the transaction received at step 34 is one which seeks a unique copy of the data and will modify that data. If the determination at step 40 is that the transaction type is not a match, then processing proceeds to step 41 where a determination is made as to whether the transaction is not modifying. If the transaction is not modifying then no snoops are required. If the check at step 41 indicates that the transaction is modifying, then processing passes to step 42 where a snoop request is again broadcast to all the local cache memories. If the determination made at step 40 is that there is a match, then at step 44 a determination is made whether or not there is an RNFID mismatch between the requesting transaction received at step 34 and the RNFID stored in the shared cache memory 18 for the cache line of data for which a hit occurred at step 36. If there is a mismatch, then at step 46 a snoop is sent directed towards the transaction source indicated by the RNFID for the cache line identified at step 36. If there is no mismatch detected at step 44 then no snoop requests need to be sent.

It will be seen from step 40 that a determination is made as to whether or not the unique status data for the cache line which hit at step 36 indicates a unique status and that this modifies the snoop behaviour. i.e. if either the cache data is not unique or the transaction is not a modifying transaction, then processing proceeds to step 41 and possibly to step 42 where a snoop request is sent to all of the local caches. Alternatively, if the unique status data has another value indicating that the cache line of data is unique and the transaction is modifying, then a different form of snoop behaviour is carried out by steps 44 and 46.

Figure 6:
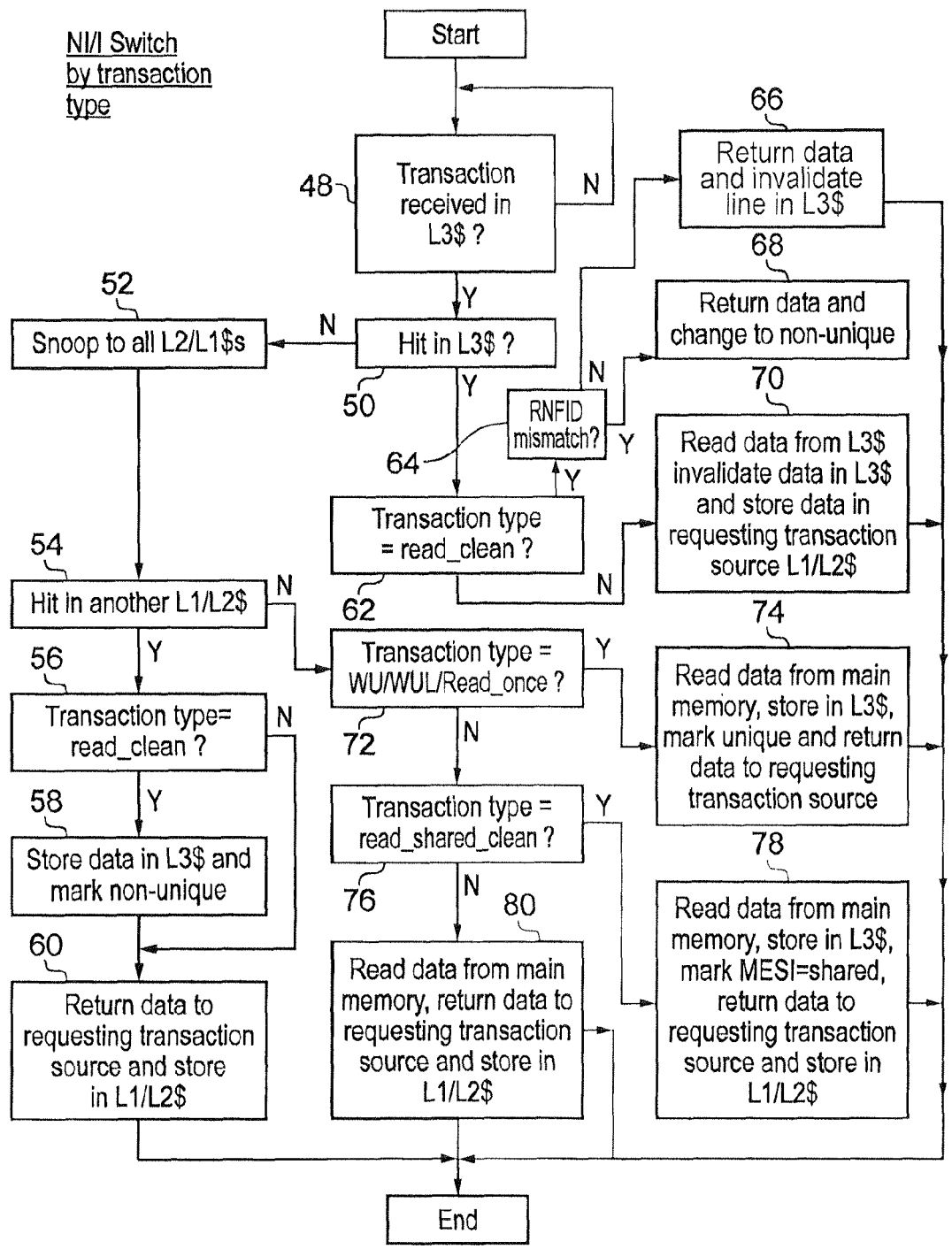
FIG. 6 is a flow diagram schematically illustrating how a switch may be made between inclusive mode operation and non-inclusive mode operation based upon transaction type.

FIG. 6 schematically illustrates a flow diagram showing how a change may be made from inclusive mode operation to non-inclusive mode operation in dependence upon transaction type. At step 48 processing waits until a transaction is received in the shared L3 cache (L3$) memory 18. At step 50 a determination is made whether or not there is a hit within the shared cache memory 18. If there is not a hit, then step 52 all of the local cache memories. Step 54 a determination is then made whether or not there is a hit within another of the local cache memories. If there is a hit, then step 56 determines whether or not the transaction type is a read_clean transaction type, i.e. a transaction which will read the data concerned but will not subsequently modify it. If the transaction is such a read_clean transaction, then step 58 the data retrieved from the L1/L2 cache that hit at step 54 is stored into the shared cache memory 18 and marked as non-unique using the unique status data 30. If the transaction type is not read_clean, then step 58 is bypassed and the data is not stored in to the shared cache memory 18.

At step 60 the data retrieved from the L1/L2 cache that hit at step 54 is returned to the requesting transaction source and stored into the local cache memory of the requesting transaction source. Thus, in dependence upon whether or not the transaction type is a read_clean transaction the data will be stored in the shared cache memory 18 as well as in the local cache memory and thus will be stored in an inclusive mode of operation. Thus, the data is stored in a mode of operation different from the default non-inclusive mode of operation.

If the determination at step 50 indicates that there is a hit within the shared cache memory 18, then at step 62 a determination is made whether or not the transaction type of the transaction received at step 48 is read_clean. If the transaction type is read_clean then at step 64 a determination is made whether or not there is a mismatch in the RNFID of the transaction received at step 48 and the value of this field stored for the cache line for which the hit occurred at step 50. If there is no mismatch, then at step 66 the data is simply returned to the requesting transaction source and the line invalidated in the shared cache memory 18. If there is an RNFID mismatch detected at step 64, then at step 68 the data is returned to the requesting transaction source and the unique status data changed to indicate a non-unique status, i.e. that the cache line of data is now being stored on behalf of more than one transaction source, thus, at step 68 the data is changed from being stored and manipulated in accordance with a non-inclusive mode of operation that is the default into an inclusive mode of operation.

If the determination at step 62 is that the transaction type is not a read_clean transaction type, then processing proceeds to step 70 where the data is read from the shared cache memory 18, invalidated in the shared cache memory 18 and stored into the requesting transaction source's local cache memory. The cache line of data thus remains as being managed in accordance with a non-inclusive mode of operation.

If the determination at step 54 was that there was no hit in another local cache memory following the absence of a hit within the shared cache memory at step 50, then processing proceeds to step 72. At step 72 a determination is made whether or not the transaction type of the transaction received at step 48 matches any one of a write_unique (WU) transaction (writes less than a full cache line of data), write_unique_line (WUL) transaction (writes a full cache line of data) or read once transaction (reads once, but will not subsequently reuse the data). If the transaction type does match at step 72, then at step 74 the data is read from the main memory, stored into the shared cache memory 18, marked as unique using the unique status data and returned to the requesting transaction source, such as the input/output device 16. This input/output device 16 does not include its own local cache memory and accordingly the data stored within the shared cache memory 18 at step 74 can serve as a cache for the otherwise cacheless transaction source 16.

If there is no transaction type matched at step 72, then processing proceeds to step 76 where a determination is made as to whether or not the transaction type is a read_shared_clean transaction type. This is the type of transaction which is typically issued for an instruction fetch for an instruction to be executed by a processor. If there is a transaction type match at step 76, then at step 78 the data is read from the main memory, and stored into the shared cache memory 18, the cache line of data using its MESI field as shared data, return the data to the requesting transaction source and the data is stored into the local cache memory of the requesting transaction source. A step 78, the cache line of data is not marked at this stage as non-unique, but the presence of this data within the shared cache memory 18 is in accordance with inclusive mode of operation and that cache line of data may be subsequently marked as non-unique via step 68 if another transaction source seeks to perform a read_clean operation on the cache line of data.

If there is no transaction type match at step 76, then at step 80 default processing is performed in which the requested cache line of data is read from the main memory, returned to the requesting transaction source and stored within the local cache memory of the requesting transaction source.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a plurality of transaction sources, each of said plurality of transaction sources having a local cache memory; and
a shared cache memory coupled to said plurality of transaction sources;
wherein said shared cache memory is configured to store at least one of:
each cache line of data stored in said shared cache memory; and
each range of cache lines of data stored in said shared cache memory in accordance with an individually selectable one of either:
(i) an inclusive mode; and
(ii) a non-inclusive mode; and wherein a change between said inclusive mode and said non-inclusive mode for a cache line is made in accordance with a transaction type indicating a degree of sharing for a transaction received by said shared cache memory for that cache line.

2. Apparatus as claimed in claim 1, wherein state data stored in said shared cache memory indicates whether a cache line of data is stored in said inclusive mode or said non-inclusive mode.

3. Apparatus as claimed in claim 2, wherein said shared cache memory is configured to store unique status data for each cache line of data stored in said shared cache memory and associated with a given one of said plurality of transaction sources, said unique status data indicating whether a cache line of data associated with a given one of said plurality of transaction sources is stored in a local cache memory of any other of said plurality of transaction sources.

4. Apparatus as claimed in claim 3, wherein said shared cache memory is configured to store transaction source identifying data for a cache line of data identifying one or more of said plurality of transaction sources associated with that cache line of data.

5. Apparatus as claimed in claim 4, wherein said transaction source identifying data identifies a single transaction source of said plurality of transaction sources.

6. Apparatus as claimed in claim 4, wherein said transaction source identifying data identifies up to a maximum number of said plurality of transaction sources corresponding to a proper subset of said plurality of transaction sources.

7. Apparatus as claimed in claim 3, wherein said shared cache memory includes snoop request generating circuitry that generates snoop requests in dependence upon said unique status data.

8. Apparatus as claimed in claim 3, wherein said shared cache memory includes snoop request generating circuitry configured to respond to a transaction request to a cache line of data received from one of said plurality of transaction sources to suppress generation of any snoop requests to other transaction sources if said transaction request hits in said shared cache memory and is stored in said non-inclusive mode.

9. Apparatus as claimed in claim 5, wherein said shared cache memory includes snoop request generating circuitry configured to respond to a transaction request to a cache line of data received from one of said plurality of transaction sources that hits in said shared cache memory to target generation of any snoop requests to transaction sources identified by said transaction source identifying data if said unique status data indicates that cache line of data is stored in said inclusive mode.

10. Apparatus as claimed in claim 3, wherein said shared cache memory is configured to respond to receipt of a transaction of one or more predetermined types from a transaction source that hits a cache line of data stored in said shared cache memory in said non-inclusive mode by switching from storing that cache line of data in said non-inclusive mode to storing that cache line of data in said inclusive mode.

11. Apparatus as claimed in claim 10, wherein said one or more predetermined types includes transactions that will read a cache line of data to a local cache memory and not subsequently modify that cache line of data stored in that local cache memory.

12. Apparatus as claimed in claim 3, wherein said shared cache memory is configured to respond to receipt of a non-modifying read transaction from a given transaction source that hits a cache line of data stored in said shared cache memory by a different transaction source by returning that cache line of data to said given transaction source for storing in a local cache memory of said given transaction source, leaving that cache line of data stored in said shared cache memory and setting the unique status data for that cache line of data to indicate that cache line of data is stored associated with a plurality of transaction sources.

13. Apparatus as claimed in claim 3, wherein said shared cache memory is configured to respond to receipt of a non-modifying read transaction from a given transaction source that misses in said shared cache memory and hits a cache line of data stored in a local cache memory of a different transaction source by returning that cache line of data to said given transaction source for storing in a local cache memory of said given transaction source, leaving that cache line of data stored in said local cache memory of said different transaction source, storing that cache line of data in said shared cache memory and setting the unique status data for that cache line of data to indicate that cache line of data is stored associated with a plurality of transaction sources.

14. Apparatus as claimed in claim 1, wherein said non-inclusive mode is a default mode for storing a cache line of data and a miss for a cache line of data in said shared cache memory by default stores that cache line of data in a local cache memory of a transaction source requesting that cache line of data and not in said shared cache memory.

15. Apparatus as claimed in claim 14, wherein said shared cache memory is configured to respond to receipt of a transaction of one or more predetermined types from a transaction source that misses in said shared cache memory to store a corresponding cache line of data to said shared cache memory in said inclusive mode.

16. Apparatus as claimed in claim 15, wherein said transaction source that misses in said shared cache memory does not have a local cache memory and said one or more predetermined types include one or more of:
   (i) a write unique transaction to a part of a cache line of data;
   (ii) a write unique transaction to all of a cache line of data; and
   (iii) a read once transaction of a cache line of data that will not subsequently reuse that cache line of data.

17. Apparatus as claimed in claim 16, wherein the transaction source that does not have a local cache memory is input/output circuitry.

18. Apparatus as claimed in claim 15, wherein said transaction source that misses in said shared cache memory has a local cache memory, said one or more predetermined types include a read transaction for a cache line of data marked as to be shared and not modified, and said cache line of data marked as to be shared and not modified is stored in said shared cache memo and said focal cache memory of said transaction source that misses in said shared cache memory.

19. Apparatus as claimed in claim 1, wherein said plurality of transaction sources includes one or more processor cores.

20. Apparatus as claimed in claim 1, wherein said local cache memory of each transaction source includes a level 1 (L1) and level 2 (L2) cache memory.

21. Apparatus as claimed in claim 1, wherein said shared cache memory is a level 3 (L3) cache memory.

22. Apparatus as claimed in claim 1, wherein said plurality of transaction sources is coupled to ring-based interconnect circuitry.

23. Apparatus for processing data comprising:
   a plurality of transaction source means for generating transactions, each of said plurality of transaction source means having a local cache memory means for storing data; and
   shared cache memory means for storing data and coupled to said plurality of transaction source means;
   wherein said shared cache memory means is configured to store at least one of:
      each cache line of data stored in said shared cache memory means; and
      each range of cache lines of data stored in said shared cache memory means in accordance with an individually selectable one of either:
         (i) an inclusive mode; and
         (ii) a non-inclusive mode; and
   wherein a change between said inclusive mode and said non-inclusive mode is made for a cache line in accordance with a transaction type indicating a degree of sharing for a transaction received by said shared cache memory means for that cache line.

24. A method of processing data comprising the steps of:
   generating transactions with a plurality of transaction sources;
   storing respective data in a local cache memory of each of said plurality of transaction sources; and
   storing data in a shared cache memory coupled to said plurality of transaction sources;
   operating said shared cache memory and the local cache memory of each of said plurality of transaction sources to store at least one of:
      each cache line of data stored in said shared cache memory; and
      each range of cache lines of data stored in said shared cache memory in accordance with an individually selectable one of either:
         (i) an inclusive mode; and
         (ii) a non-inclusive mode; and
   wherein a change between said inclusive mode and said non-inclusive mode is made for a cache line in accordance with a transaction type indicating a degree of sharing for a transaction received by said shared cache memory for that cache line.

* * * * *